UNITED STATES PATENT OFFICE.

WILLIAM W. ROBINSON, OF RIPON, ASSIGNOR OF ONE-HALF TO GEORGE N. LYMAN, OF MILWAUKEE, WISCONSIN.

PROCESS OF PRESERVING WOOD.

SPECIFICATION forming part of Letters Patent No. 294,676, dated March 4, 1884.

Application filed August 31, 1883. (No specimens.)

*To all whom it may concern:*

Be it known that I, WILLIAM W. ROBINSON, of Ripon, in the county of Fond du Lac and State of Wisconsin, have invented certain new and useful Improvements in a Process of Treating Wood, of which the following is a full, clear, and exact description.

The invention relates to certain new and useful improvements in a process of treating wood, by which the same is rendered fire and weather proof; and the invention consists in a composition for treating shingles and other wood, composed of a solution of salt, quicklime, copperas, mineral paint, and sulphur mixed with water; and further, in a novel process of treating the same, all as will be hereinafter fully described, and set forth in the claim hereto annexed.

In carrying out my invention, I first use a composition of about the following proportions: six parts salt, six parts quicklime, two parts copperas, two parts mineral paint, and two parts sulphur. The above-described parts I mix with water in a tank suitable for the purpose, and then place the shingles or other wood to be treated in said tank and boil the solution a suitable time, the effect of which is to take out all the sap that may be in the wood and fill the pores with the mixture.

It is well known that the sap contained in shingles or lumber very soon decays the wood, if exposed to the weather, and by the above-described process the sap is all taken out. After subjecting the shingles or other wood to the above-described process, and then drying the same, I take six parts of mineral paint—such, for instance, as white lead in oil, or iron ore dug up, dried, and ground, and mixed with oil, or any other of the common mineral paints—with three parts of whiting, two parts of glue, and six parts of quicklime, and mix with a suitable quantity of linseed-oil, and, after heating the same, dip or cover the shingles or other wood with the preparation. This latter process, taken in connection with the first process, makes the shingles or other wood both weather and fire proof.

I also may add any suitable coloring material to give the shingles or other wood any desired tint.

Having thus fully described my invention, what I claim as new, and desire to secure by Letters Patent, is—

The herein-described process of treating wood to render it fire and weather proof, consisting in subjecting it to a bath in a boiling solution composed of salt, quicklime, copperas, mineral paint, and sulphur mixed with water, subsequently drying the wood, and then coating it with a hot solution composed of mineral paint, as described, whiting, glue, and quicklime mixed with linseed-oil, substantially as specified.

WILLIAM W. ROBINSON.

Witnesses:
R. T. GRAVEY,
A. S. CROOKER.